(No Model.) 3 Sheets—Sheet 1.

L. S. KEETER.
SAW FILING AND SETTING MACHINE.

No. 508,111. Patented Nov. 7, 1893.

Witnesses
John C. Shaw
O. S. A*f*.

Inventor
Logan S. Keeter
By his Attorneys,
C. A. Snow & Co.

(No Model.) 3 Sheets—Sheet 2.
L. S. KEETER.
SAW FILING AND SETTING MACHINE.
No. 508,111. Patented Nov. 7, 1893.
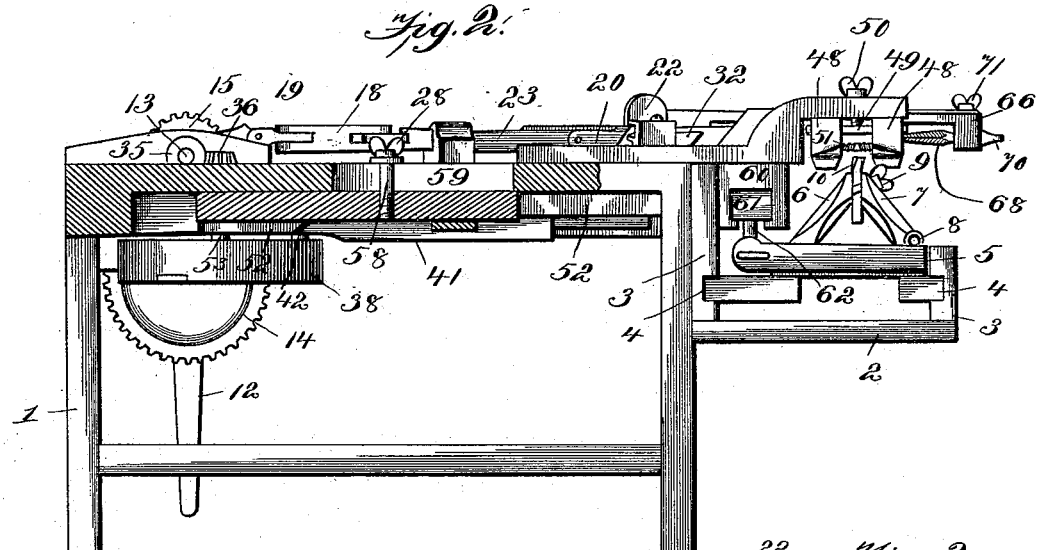
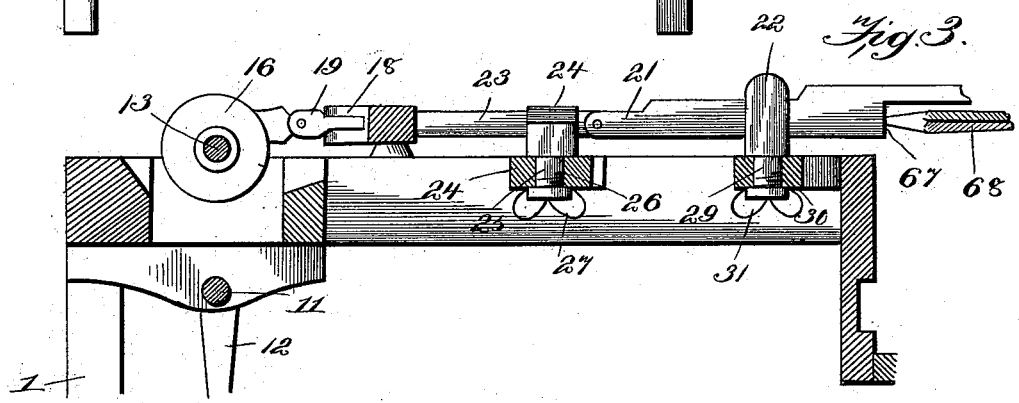
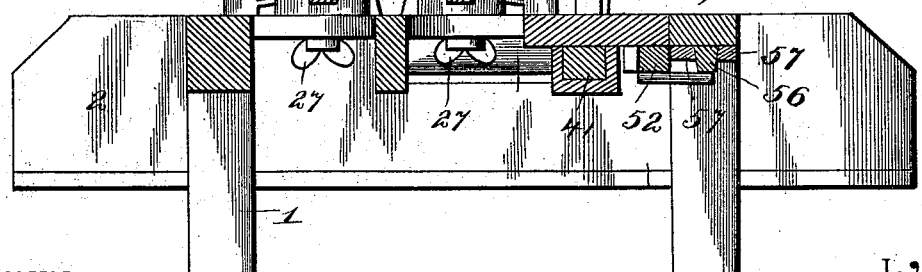
Witnesses
John C. Shaw
Inventor
Logan S. Keeter
By his Attorneys.

(No Model.) 3 Sheets—Sheet 3.
L. S. KEETER.
SAW FILING AND SETTING MACHINE.
No. 508,111. Patented Nov. 7, 1893.

Witnesses
John C. Shaw

Inventor
Logan S. Keeter

By his Attorneys,
C. A. Snow & Co.

UNITED STATES PATENT OFFICE.

LOGAN S. KEETER, OF UNION MILLS, NORTH CAROLINA.

SAW FILING AND SETTING MACHINE.

SPECIFICATION forming part of Letters Patent No. 508,111, dated November 7, 1893.

Application filed May 20, 1893. Serial No. 474,949. (No model.)

*To all whom it may concern:*

Be it known that I, LOGAN S. KEETER, a citizen of the United States, residing at Union Mills, in the county of Rutherford and State of North Carolina, have invented a new and useful Saw Filing and Setting Machine, of which the following is a specification.

My invention relates to improvements in saw-filing and setting machines, the objects in view being to provide reciprocating file carriers which operate in opposite directions, and which are arranged to bring the files in contact with the saw teeth simultaneously whereby the lateral strain upon the saw blade is counterbalanced; furthermore, to provide means whereby the saw teeth are subject to a draw-stroke only; furthermore, to provide improved means for accomplishing the adjustment of the files; furthermore, to provide simple and efficient means for adjusting the jaws of the reciprocating setting head; to provide simple and direct operating devices for the setting head and for the adjustment of the stroke thereof; and to provide improved means for feeding the saw blade and for adjusting such feeding devices to accommodate teeth of different lengths.

Further objects and advantages of my invention will appear in the following description, and the novel features thereof will be particularly pointed out in the claims.

Figure 1:
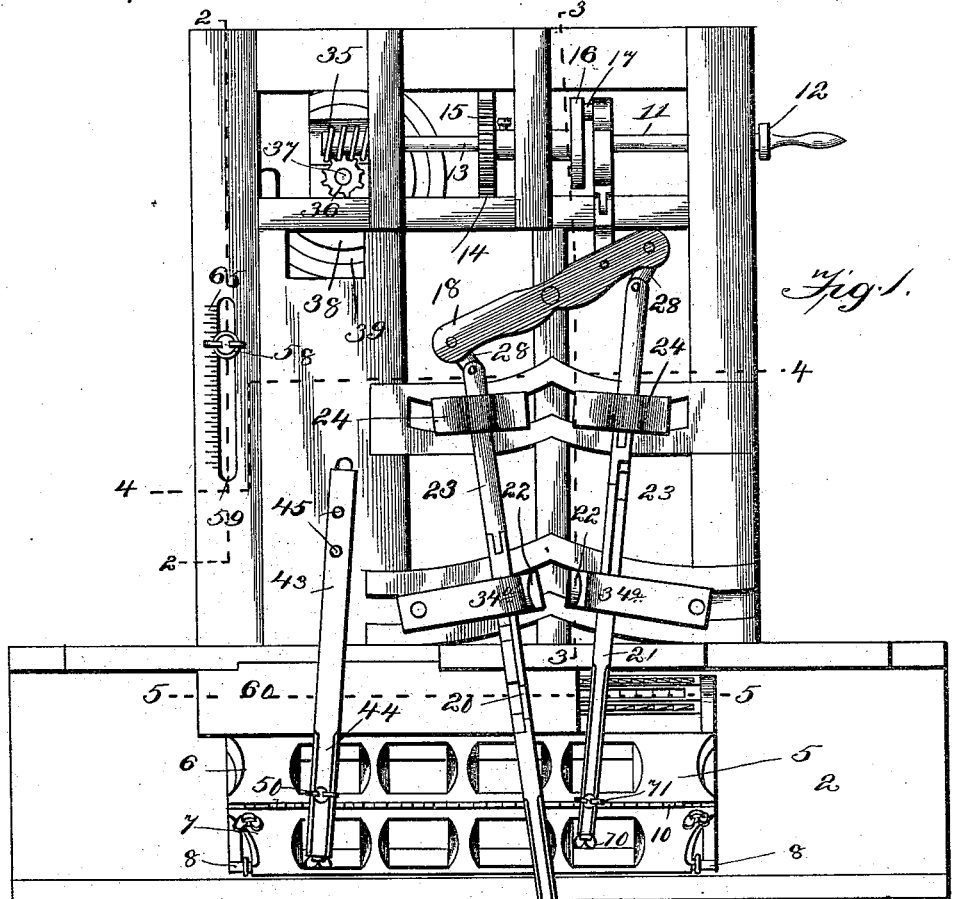
Figure 8:
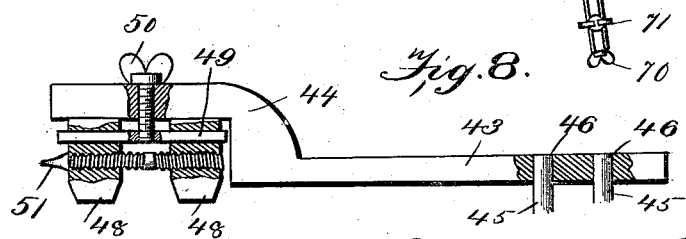
Figure 9:
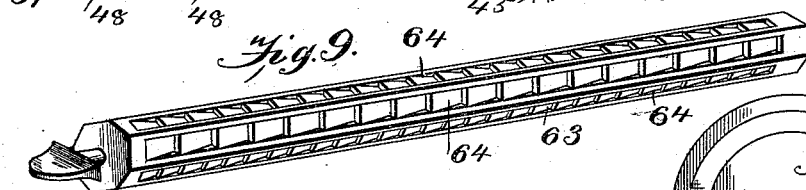
Figures 10, 11:
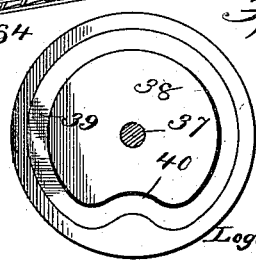
Figure 6:
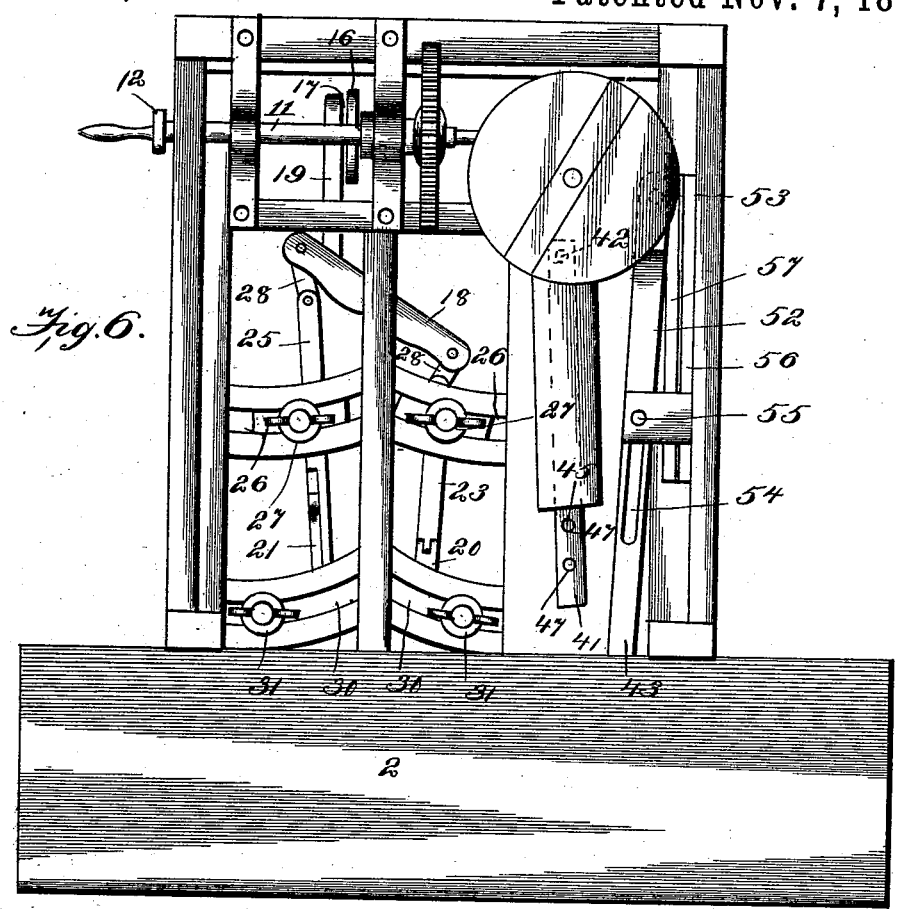
Figure 5:
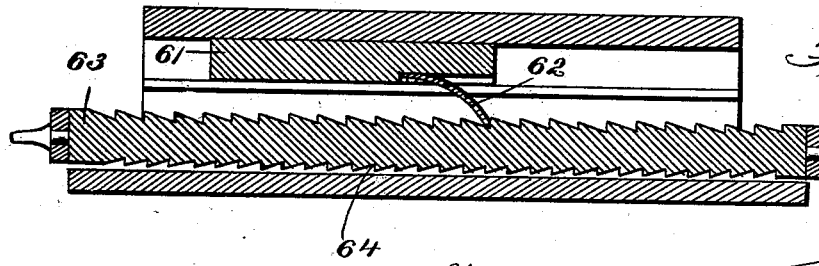
Figure 7:
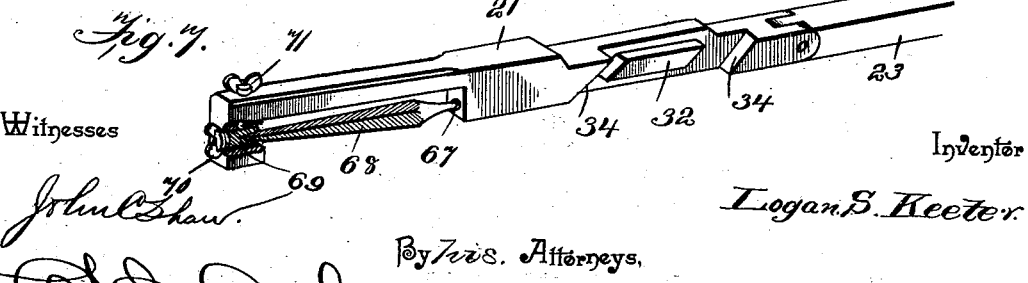

In the drawings—Figure 1 is a plan view of a saw-filing and setting machine embodying my invention. Fig. 2 is a side view partly in section of the same upon line 2—2 of Fig. 1. Fig. 3 is a longitudinal section upon line 3—3 of Fig. 1. Fig. 4 is a transverse section upon line 4—4 of Fig. 1. Fig. 5 is a similar section through the feeding device upon line 5—5 of Fig. 1. Fig. 6 is a bottom plan view. Fig. 7 is a detail view in perspective of one of the file carriers and connections. Fig. 8 is a detail view partly in section of the setting head. Fig. 9 is a similar view of the adjustable feed rack. Fig. 10 is a similar view of one of the tongued guides detached. Fig. 11 is a view of the cam wheel.

Similar numerals of reference indicate corresponding parts in all the figures of the drawings.

1 designates the supporting frame-work which is provided at its front end with a feedway 2, provided with vertical side bars 3, having facing guide grooves 4. The carriage 5 is fitted at its edges in said guide grooves and is provided with the upwardly convergent clamping jaws 6 and 7, of which the former is fixed permanently to the carriage and the latter is pivotally connected thereto, as shown at 8. The upper contiguous edges of the clamping jaws 6 and 7 are beveled to lie in parallel planes when the movable jaw is in its operative position, and the free edge of the movable jaw is adjustably connected to the corresponding edge of the fixed jaw by means of set screws 9. The saw 10 is arranged between and is held in operative position by the free edges of the clamping jaws.

11 represents the main or driving shaft which is provided with a crank 12 or other suitable means for communicating power to the shaft, and 13 represents a counter shaft which is operatively connected to the main or driving shaft by means of gears 14 and 15, of which the former, which is secured to the main or driving shaft, is larger than the latter in order to multiply the speed of the counter shaft. The counter shaft carries a crank disk 16 having a crank pin 17.

18 represents a horizontally-disposed rocking or oscillating head, one arm of which is connected by means of a link 19 to the said crank pin.

20 and 21 represent, respectively, the reciprocating file carriers which are slidably mounted in guides 22 which are fixed to the frame-work of the machine, and the rear ends of these carriers are connected to the arms of the oscillating head by means of pivotal push-bars 23 operating in guides 24. The guides 24 are capable of lateral adjustment independently of each other, and for this purpose are provided with depending studs 25 which fit in arc-shaped slots 26 in the framework, set screws 27 being provided to lock said guides at the desired adjustment. The rear ends of the push-bars 23 are not connected directly to the arms of the oscillating head and are provided with pivotally connected links 28 which permit of angular adjustment of the file carriers by means of the guides 24 without interfering with the transmission of power from the head to the push-bars. The guides 22 are similarly provided with depending lugs 29 fitting in slots 30 in the frame-work and carrying set screws 31.

By means of the above described adjustable guides the relative angular positions of the carriers may be varied to produce any desired bevel upon the teeth of the saw, as will be readily understood by those skilled in the art.

The carriers are provided with lateral guiding webs 32 having oppositely beveled ends, and the guides 22 are provided with spring tongues 33 which are arranged at their free ends to contact with said guiding webs to alternately depress the carriers (which are capable of vertical movement in the guides 22) to bring the files into contact with the work or to elevate the same out of contact therewith. The front end of one of the guiding webs is beveled upon its upper side and the front end of the other guiding web is beveled upon its under side, and correspondingly the rear ends of said webs are oppositely beveled, whereby one of the carriers is elevated upon its forward movement and the other upon its rearward movement, and vice versa. In other words, the guiding webs are provided with oppositely beveled extremities to cause both of the carriers to be depressed simultaneously and elevated simultaneously, thus bringing the oppositely moving files into contact with the saw teeth at the same time to exert the strain upon opposite sides of the saw blade. The carriers are provided, adjacent to the opposite ends of the guiding webs and in the same plane therewith, with beveled shoulders 34, and the guides 22 are provided with supplemental spring tongues 34$^a$ to engage such shoulders at the ends of the strokes of the carriers to depress the latter positively to their operative positions after they have made a stroke in their elevated positions. The counter shaft above described is provided with a worm 35 with which meshes a worm-gear 36 upon the upper end of a vertical spindle 37, said spindle carrying a cam wheel 38 which is provided in its upper surface with a cam slot 39 having an off-set 40.

41 represents a reciprocating bar which is provided with a depending pin 42 to engage said cam-slot, and fixed to the opposite end of the bar is the shank 43 of the setting head 44 which overhangs the saw carriage. The bar 41 is provided with vertical pins 45 which operate in a slot 46 in the top of the supporting frame-work, and the rear end of the shank 43 of the setting head is provided with corresponding sockets 47 to receive such pins. The off-set in the cam-slot, as above described, is of such shape as to give the setting head a rearward and a forward movement in succession, such movements being equal as to distances. The head is provided with jaws 48 which are slidably mounted upon a feather 49 which is connected at an intermediate point to the body portion of the head by means of a set-screw 50, and by tightening such set-screw the feather may be elevated to bring the upper ends of the jaws into contact with the under surface of the head and thus lock said jaws firmly against movement. The relative adjustment of the jaws is accomplished by means of a right and left hand screw 51 which is threaded longitudinally in the jaws, such adjustment being attainable after the set-screw has been loosened to relieve the contact between the upper ends of the jaws and the under surface of the head.

52 represents an oscillating lever, the rear end of which is provided with a depending pin 53 to engage the slot in the cam-wheel and which is further provided at an intermediate point with a longitudinal slot 54 by which the lever is mounted upon an adjustable pivot pin 55. This pivot pin is carried by an adjusting slide 56 which is mounted in suitable guides 57 upon the under surface of the frame-work and may be locked at any desired adjustment by means of a set-screw 58 which operates in a slot 59 in the frame-work. By means of this adjustable pivot the throw of the free or front end of the oscillating lever may be varied at will.

In a suitable transverse guide 60, which is arranged above the carriage guide-way, is slidably fitted a feed-bar 61 provided with a depending spring tongue 62, and to this feed-bar is pivotally connected the front end of the oscillating lever. Rotatably mounted upon the carriage is a feed-rack 63 which is polygonal in section, the several surfaces thereof being provided with racks 64 having teeth of different lengths, and by the rotation of said rack-bar any desired rack may be brought into operative relation to the spring tongue which is carried by the feed-bar. Obviously, the throw of the oscillating lever by which the feed-bar is controlled must be adjusted to correspond accurately with the length of the teeth of the rack to be used, such adjustment being readily accomplished by means of the adjustable pivot pin upon which said oscillating lever is mounted. A suitable scale 65, as indicated in Fig. 1 of the drawings, may be arranged adjacent to the slot 59, the graduations upon such scale corresponding with the various racks which are carried by the rotatable rack-bar. The carriers are provided with depending ears 66, the rear ear being provided with a socket 67 to receive the rear end of the file 68, and the front ear being provided with a registering bearing in which is fitted a rotatable socket 69 having a thumb-hold 70. The front end of the file is fitted in said socket 69, and by means of the said thumb-hold the file may be rotated or adjusted to bring either of its faces at any desired lateral inclination, and the teeth of the saw to provide the required inclination of the front and rear sides of the teeth. The rotatable socket is located in any desired position by means of a set-screw 71.

This being the construction of my improved machine the operation thereof, briefly stated, is as follows: Power being applied to the driving shaft motion is communicated through the various operating connections to the oscillating head and through the medium of the latter to the reciprocating file carriers. These file carriers are capable of any desired angular adjustment in a horizontal plane to increase or diminish the bevel upon the face of the saw teeth, such adjustment being attainable without causing the operating parts to become cramped. Through the medium of the counter shaft, worm-gearing and vertical spindle, motion is communicated to the cam-wheel which operates the oscillating lever and through the medium of the latter, the feed-bar by which an intermittent forward movement of the saw carriage is produced, the extent of each movement of the carriage being controlled by the position of the pivotal point of the oscillating lever, and the particular rack with which the feed-tongue engages. Movement is communicated from the cam-wheel to the setting-head by means of the reciprocating-bar which carrries the vertical pins 45, the shank of such head being detachably fitted upon these pins whereby the setting mechanism may be detached from the machine.

Various changes in the form, proportion, and minor details of construction may be resorted to without departing from the spirit or sacrificing any of the advantages of my invention.

Having described my invention, what I claim is—

1. In a machine of the class described, the combination with a driving shaft, of an oscillating head, connections between such head and the driving shaft, reciprocating carriers connected to said head and provided with guiding webs having oppositely beveled terminals, and guides in which such carriers are slidably mounted provided with spring tongues to engage such webs whereby the carriers are simultaneously elevated and depressed, substantially as specified.

2. In a machine of the class described, the combination with a driving-shaft, of an oscillating head connected thereto, laterally adjustable guides, file carriers slidably fitted in said guides and capable of relative adjustment thereby, connections between the carriers and the oscillating head, oppositely beveled guiding webs projecting laterally from the carriers, and tongues arranged to engage such webs to simultaneously elevate and depress the carriers, substantially as specified.

3. In a machine of the class described, the combination with a driving shaft, of an oscillating head connected thereto, registering guides slidably mounted in arc-shaped slots and provided with suitable locking devices, connections between the file carriers and said head, and means for simultaneously elevating and depressing the carriers, substantially as specified.

4. In a machine of the class described, the combination with a driving shaft, of an oscillating head connected thereto, registering guides slidably mounted in arc-shaped slots and provided with adjusting devices, reciprocating file carriers, push-bars pivotally connected to the rear ends of such carriers, and links connecting the push-bars to said oscillating head, the carriers and push-bars being slidably mounted in the said guides, substantially as specified.

5. In a machine of the class described, the combination with a driving-shaft, of reciprocating file carriers provided with lateral oppositely beveled guiding webs and contiguous beveled shoulders, operating connections between such carriers and the driving-shaft, and guides provided with spring tongues to engage said guiding webs, and supplemental superposed spring tongues to engage said shoulders at the terminals of the strokes of the carriers, substantially as specified.

6. In a machine of the class described, the combination with a driving shaft, saw filing mechanism and connections, of a cam-wheel operatively connected to said shaft, a reciprocating bar connected to said cam-wheel and provided with vertical pins, a setting-head having its shank provided with sockets to receive such pins, and adjustable jaws carried by the head, substantially as specified.

7. In a machine of the class described, the combination with a driving shaft, saw filing mechanism and connections, of a reciprocating setting-head, operating connections between such head and the shaft, a feather carried by the head, a set-screw engaging said feather, jaws slidably mounted upon the feather and adapted to be brought into contact with the head, and a right and left hand adjusting screw connecting the jaws, substantially as specified.

8. In a machine of the class described, the combination with a driving shaft, a saw carriage, a rack-bar carried by said carriage, and a reciprocating feed-bar provided with a tongue to engage said rack, of a cam-wheel operatively connected to the driving shaft, an oscillating lever connected at one end to the cam-wheel and at the other end to said feed-bar, an adjustable pivot pin engaging a longitudinal slot in said oscillating lever, and means for adjusting said pivot pin, substantially as specified.

9. In a machine of the class described, the combination with a driving shaft, a saw carriage, a rack-bar, and a feed-bar carrying a tongue to engage said rack-bar, of a cam-wheel operatively connected to said driving shaft, an oscillating lever connected at one end to said cam-wheel and at the other end to the feed-bar, an adjustable slide carrying a pivot pin and engaging a longitudinal slot in said oscillating lever, and a setting-device for said slide, substantially as specified.

In testimony that I claim the foregoing as my own I have hereto affixed my signature in the presence of two witnesses.

LOGAN S. KEETER.

Witnesses:
GEO. BIGGERSTOFF,
J. M. TOMS.